US012280871B2

(12) United States Patent
Strasser et al.

(10) Patent No.: US 12,280,871 B2
(45) Date of Patent: Apr. 22, 2025

(54) RECOIL ELIMINATION

(71) Applicant: Tonner Drones, Biot (FR)

(72) Inventors: Michael Strasser, Cardiff (GB); Antoine Volard, Cardiff (GB)

(73) Assignee: Tonner Drones, Biot (FR)

( * ) Notice: Subject to any disclaimer, the term of this patent is extended or adjusted under 35 U.S.C. 154(b) by 464 days.

(21) Appl. No.: 17/416,388

(22) PCT Filed: Nov. 22, 2019

(86) PCT No.: PCT/GB2019/053317
§ 371 (c)(1),
(2) Date: Jun. 18, 2021

(87) PCT Pub. No.: WO2020/128420
PCT Pub. Date: Jun. 25, 2020

(65) Prior Publication Data
US 2022/0185476 A1    Jun. 16, 2022

(30) Foreign Application Priority Data

Dec. 20, 2018 (GB) .................................. 1820904

(51) Int. Cl.
*B64D 1/02*  (2006.01)
*B64U 101/00*  (2023.01)

(52) U.S. Cl.
CPC ............ *B64D 1/02* (2013.01); *B64U 2101/00* (2023.01)

(58) Field of Classification Search
CPC . B64D 1/02; B64C 39/022; F42B 5/05; F41A 1/08
See application file for complete search history.

(56) References Cited

U.S. PATENT DOCUMENTS 2,472,111 A    6/1949  Kroeger et al.
2,984,156 A *  5/1961  Gunnar .................... F41A 1/08
                                                       89/1.705

(Continued)

FOREIGN PATENT DOCUMENTS

AU           603267 B2    11/1990
AU      20190408916      11/2019

(Continued)

OTHER PUBLICATIONS

PCT/GB2019/053317, International Search Report and Written Opinion dated Mar. 10, 2020, 14 pages—English.

(Continued)

*Primary Examiner* — Benjamin P Lee
(74) *Attorney, Agent, or Firm* — Andrew F. Young, Esq.; NOLTE LACKENBACH SIEGEL

(57) ABSTRACT

An ejection assembly for ejecting an ejection body comprises an ejection channel and an anti-recoil channel; a barrier structure having a first interface boundary and a second interface boundary, including a barrier portion between the first interface boundary and the second interface boundaries; an attachment mechanism for fastening the barrier structure between the ejection channel and the anti-recoil channel; an ejection activation mechanism housed within the barrier structure adjacent the first interface boundary, to initiate ignition of ejection propulsion material contained in an ejection capsule placed adjacent the first interface boundary; and an anti-recoil activation mechanism housed within the barrier structure adjacent the second interface boundary, to initiate the ignition of anti-recoil propulsion material contained in an ejection capsule placed adjacent the second interface boundary.

20 Claims, 8 Drawing Sheets

(56) References Cited

U.S. PATENT DOCUMENTS

| | | | | |
|---|---|---|---|---|
| 4,050,351 | A | * | 9/1977 | Stauff ............... F41A 1/10 89/1.701 |
| 4,132,148 | A | * | 1/1979 | Meistring ........... F41A 1/10 89/14.6 |
| 4,643,071 | A | * | 2/1987 | Baechler ............ F41A 1/10 89/1.701 |
| 5,216,194 | A | * | 6/1993 | Boire ................. F41A 1/08 102/376 |
| 7,418,896 | B1 | | 9/2008 | Dindl et al. |
| 7,624,668 | B1 | | 12/2009 | Sanford |
| 2009/0031912 | A1 | * | 2/2009 | Gilbert .............. F41A 1/08 102/443 |
| 2010/0282057 | A1 | | 11/2010 | Rapp et al. |
| 2014/0076134 | A1 | | 3/2014 | Schroeder |
| 2018/0335779 | A1 | | 11/2018 | Fisher et al. |
| 2022/0185476 | A1 | | 6/2022 | Strasser et al. |

FOREIGN PATENT DOCUMENTS

| | | | | |
|---|---|---|---|---|
| CA | 3127563 | | 6/2020 | |
| DE | 2040863 | A1 | 3/1972 | |
| DE | 3730158 | A1 | 12/1990 | |
| EP | 3899408 | A1 | 10/2021 | |
| FR | 954164 | A * | 12/1949 | ............... F41A 1/08 |
| GB | 08 390272 | A | 7/1947 | |
| GB | 20180020904 | | 12/2018 | |
| WO | WO-2007049060 | A1 * | 5/2007 | ............... F41A 1/08 |
| WO | WO2020/128420 | A1 | 6/2020 | |

OTHER PUBLICATIONS

Australian Pat. Appln. No. 2019408916, Examination Report dated Dec. 4, 2023, 3 pages—English.

* cited by examiner

RECOIL ELIMINATION

CROSS REFERENCE TO RELATED APPLICATIONS

This application relates to, and claims priority from Ser. No.: PCT/GB2019/053317 filed Nov. 22, 2019, the entire contents of which are incorporated herein by reference, which in turn claims priority from GB Ser. No.: 1820904.9 filed Dec. 20, 2018.

FIGURE SELECTED FOR PUBLICATION

FIG. 1A

BACKGROUND OF THE INVENTION

Field of the Invention

This disclosure relates generally to ejection systems, particularly but not exclusively for ejecting bodies from a moveable platform such as an unmanned aerial vehicle (UAV).

Description of the Related Art

Various ejection systems for ejecting bodies at relatively high speed are known in the art, some of which can be mounted on platforms for use on airplanes or boats, for example. Some known systems comprise anti-recoil mechanisms for reducing the net ejection reaction force. For example, some known ejection systems at least partly counter-balance the reaction force of an ejected body by ejecting sacrificial material or gas in an opposite direction. Example ejection systems are disclosed in U.S. Pat. Nos. 2,472,111, 7,624,668 and 7,418,896. U.S. Pat. No. 7,418,896 describes a recoilless weapon system with a rear portion and a barrel hinged to the rear portion to facilitate placement of a ballast payload cartridge within the rear portion.

There is a need for an ejection system exhibiting reduced net reaction force on the system when a body is ejected, and reduced recoil of the system; and particularly but not exclusively for an ejection system having relatively low mass, and/or enhanced mobility or portability.

Aspects and Summary of the Invention

Aspects and embodiments are set out in the appended claims. These and other aspects and embodiments are described herein.

According to a first aspect, there is provided an ejection assembly for ejecting an ejection body, comprising an ejection channel having an open end, for conveying an ejection gas pressure pulse and the ejection body to exit the distal open end; and an anti-recoil channel having an open end, for conveying an anti-recoil gas pressure pulse to exit the distal open end; a barrier structure having a first interface boundary and a second interface boundary, including a barrier portion between the first interface boundary and the second interface boundaries; an attachment mechanism for fastening the barrier structure between the ejection channel and the anti-recoil channel, the open end of the ejection channel disposed opposite and remote from the first interface boundary, and the open end of the anti-recoil channel disposed opposite and remote from the second interface boundary; an ejection activation mechanism housed within the barrier structure adjacent the first interface boundary, operable to initiate, in response to receiving an ejection signal, combustion of ejection propulsion material contained in an ejection capsule placed adjacent the first interface boundary; an anti-recoil activation mechanism housed within the barrier structure adjacent the second interface boundary, operable to initiate, in response to receiving an anti-recoil signal, combustion of anti-recoil propulsion material contained in an ejection capsule placed adjacent the second interface boundary; wherein the barrier portion prevents pressure communication between the ejection gas pressure pulse in the ejection channel and the anti-recoil gas pressure pulse in the anti-recoil channel. Combustion of the ejection propulsion material produces the ejection gas pressure pulse for driving the ejection body through the ejection channel to exit the distal open end; and combustion of the anti-recoil propulsion material produces the anti-recoil gas pressure pulse.

In other words, ignition of the ejection propulsion material produces the ejection gas pressure pulse within the ejection channel, for driving the ejection body through the ejection channel to exit the open end, and generating an ejection reaction force on the ejection assembly; and ignition of the anti-recoil propulsion material produces the anti-recoil gas pressure pulse within the anti-recoil channel, generating an anti-recoil reaction force on the ejection assembly, opposing the ejection reaction force. The barrier portion divides the ejection assembly into at least two substantially independent pressure zones, these being in the ejection channel and the anti-recoil channel, respectively, and substantially prevents the ejection and anti-recoil gas pressure pulses from interacting with, or interfering with, each other. The barrier structure may comprise a single barrier portion, or comprise a plurality barrier portions, that are cooperatively configured such that when they are assembled, they fit together to form the barrier structure.

The ejection assembly may be provided in an assembled condition as for use, or as a kit of parts, or in partially assembled form.

Viewed from a second aspect, there is provided a barrier structure for an example disclosed ejection assembly, having a first interface boundary and a second interface boundary, including a barrier portion between the first and second interface boundaries; and comprising an ejection activation mechanism housed within the barrier structure adjacent the first interface boundary; an anti-recoil activation mechanism housed within the barrier structure adjacent the second interface boundary; an ejection capsule containing the ejection propellant material adjacent the ejection activation mechanism at the first interface boundary; and an anti-recoil capsule containing the anti-recoil propellant material adjacent the anti-recoil activation mechanism at the second interface boundary; configured such that the ejection activation mechanism can engage the ejection capsule in response to receiving an ejection signal, to initiate ignition of the ejection propulsion material, and the anti-recoil activation mechanism can engage the anti-recoil capsule in response to receiving an anti-recoil signal, to initiate ignition of the anti-recoil propulsion material.

According to a third aspect, there is provided a vehicle assembly comprising a vehicle and an example disclosed ejection assembly, in which the vehicle and the ejection assembly are cooperatively configured for mounting the ejection assembly onto the vehicle.

Various example methods and systems are envisaged by this disclosure, of which various non-limiting, non-exhaustive examples and variations are described as follows.

In some example arrangements, the attachment mechanism may include an ejection channel connection mechanism for fastening the ejection channel to a first side of the barrier structure, and an anti-recoil channel connection mechanism for fastening the anti-recoil channel at a second side of the barrier structure; the barrier portion disposed between the ejection and anti-recoil channels. The first and second sides of the barrier structure body may be opposite each other. One or both of the channel connection mechanisms may include screw threading that mates with corresponding screw threading on one or both of the ejection and anti-recoil channels.

In some example arrangements, the barrier structure may include an ejection capsule containing the ejection propellant material adjacent the ejection activation mechanism at the first interface boundary; and an anti-recoil capsule containing the anti-recoil propellant material adjacent the anti-recoil activation mechanism at the second interface boundary: the barrier portion disposed between the ejection capsule and the anti-recoil capsule.

Example arrangements in which the barrier structure comprises the ejection and anti-recoil capsules may have the aspect of easier, or more rapid mounting of the cartridge into the channel body.

The first and second boundaries may be opposite each other in some examples. The interface boundaries provide interfaces between the ejection and anti-recoil activation mechanisms, and the respective ejection and anti-recoil capsule, when inserted into the respective channel in use. The interface between the activation mechanism and a capsule enables the activation mechanism to engage the capsule and ignite primer material contained in the capsule. An electrically operated contact pin may engage a rear end of a capsule, where primer material may be contained.

In some example arrangements, the barrier structure may comprise one or more capsule encasement, such as a sleeve or jacket, enclosing all or part of the contents of the capsule. In some examples, the barrier structure may comprise a plurality of capsules that can be connected to each other, and each capsule may comprise a respective outer casing. For example, an ejection capsule may comprise ejection propellant material as well as at least a part of the ejection body encased within a jacket.

In some example arrangements, the ejection assembly may include a capsule fastening mechanism for attaching the ejection and the anti-recoil capsules to each other.

In some example arrangements, the ejection channel and the anti-recoil channel are provided as respective portions of a channel structure; the channel structure may include a barrier chamber for accommodating the barrier structure, the ejection channel and the anti-recoil channel being on different sides of the barrier portion. The channel structure and the barrier structure may include cooperating interconnection mechanisms, operable to fasten the barrier structure to the channel structure.

In some example arrangements, the attachment mechanism may comprise a channel attachment mechanism for fastening the ejection channel to the anti-recoil channel, to provide a channel assembly and a barrier attachment mechanism for fastening the barrier structure to the channel assembly. In other examples, the ejection channel and the anti-recoil channel may be provided as portions of a unitary channel body, the channel body including a fastening means for fastening the barrier structure to the channel body (that is, the ejection and anti-recoil channels may be parts of a single channel body). In some examples, the ejection channel and the anti-recoil channel may each include a fastening mechanism for attaching them to each other; and in some examples, each of the ejection and anti-recoil channels may include respective mating interconnection mechanisms for interconnecting them to each other (for example, mating screw threading).

The barrier structure may include a radial projection extending from the barrier portion, and a barrier chamber of the channel structure may include a recess, for receiving the radial projection. In some example arrangements, the barrier portion may include a flange portion, and the channel body may include a mating recess for receiving the flange portion. A fastener for attaching the ejection and anti-recoil channels to each other may include a mating slot for receiving the flange portion (in a tongue and groove arrangement, for example).

In some example arrangements, the ejection assembly may comprise an activation control system for initiating and transmitting the ejection signal to the ejection activation mechanism, and the anti-recoil signal to the anti-recoil activation mechanism. The activation control system may include an electrical connection between the ejection activation mechanism and the anti-recoil activation mechanism, operable to determine the relative timing of the ejection signal and the anti-recoil signal. For example, the ejection and anti-recoil activation mechanisms may be connected to each other by an electrical circuit, which may include a variable or fixed signal delay means for determining a timing delay between the activation of the ejection and anti-recoil activation mechanisms.

In some examples, the activation control system may be configured for allowing the timing of the ejection and anti-recoil signals, and consequently the activation of the ejection and anti-recoil activation mechanisms, respectively, to be controlled independently of each other. The activation control system may be configured for allowing the ejection activation mechanism and the anti-recoil activation mechanism to be activated simultaneously; or for determining a time delay between their respective activation.

The ability to control the ejection and anti-recoil activation mechanisms independently of each other, particularly the timing of the respective activations, may enable different time-dependent gas pressure behavior (pressure-time curves) within the ejection and anti-recoil channels to be accommodated for reducing the net reaction force on the ejection assembly, and the recoil of the ejection assembly. This is enabled by the barrier portion separating the ejection and anti-recoil channels into substantially independent pressure zones.

A time lag between the activations may be predetermined during assembly, by a configuration of an electronic coupling of the activation mechanism; and/or the timing relationship between the ejection and anti-recoil activation mechanisms may be programmable, in which operating parameters may be set by a user and read by a processor capable of initiating the activations. Some example ejection assemblies may comprise an electronic control system for controlling operating parameters of the one or more channel assemblies, and/or cartridge assemblies, and/or activation mechanisms. This may enable fine tuning of the pressure behavior with time in the ejection channel independently of the pressure behavior with time in the anti-recoil channel.

In some example arrangements, an ejection assembly may comprise an operation system for operating the ejection assembly, and/or an example ejection assembly may be configured to be remotely controllable, in which control signals may be transmitted from a control unit or device via cables connected to the ejection assembly, or wirelessly by means of radio or other electromagnetic radiation.

In some example arrangements, the barrier portion may include one or more ducts for accommodating a signal transport medium, for conveying the ejection and anti-recoil signals to the ejection and anti-recoil activation mechanisms, respectively. Examples of signal transport media that may be conveyed through the barrier include electrically conducting wire, and/or optical fiber. The signal transport media may extend into the ducts from outside the barrier portion.

In some example arrangements, at least one of the ejection activation mechanism and the anti-recoil activation system comprising a strike element such as pin (for example, a contact pin) for electrically, mechanically, or electromechanically engaging the respective ejection capsule or anti-recoil capsule adjacent the respective first interface boundary or second interface boundary, to initiate ignition of the respective ejection propulsion material or anti-recoil propulsion material contained in the respective ejection or anti-recoil capsule. The ejection and anti-recoil propellant materials may be of the same type, or of different types.

The capsule may include a primer material that is ignited when the strike mechanism engages the capsule, and the propulsion material may be subsequently ignited by the primer material. In some example arrangements, activation of the ejection and/or the anti-recoil gas pressure pulse may each be achieved by the cooperation of primers connected in series (for example, a commercially available electric match head); the time shift/delay relationship may be related to the reliability and accuracy of each primer only. The accuracy of the activation time may be changed by changing the primer or by operating them under more or less electric current.

In some example arrangements, at least one of the ejection activation mechanism and the anti-recoil activation mechanism may comprise a resilient jacket, the resilient jacket disposed between the strike element and the barrier portion, for absorbing recoil energy imparted to the strike element by the ejection or anti-recoil gas pressure pulse. The resilient jacket may enhance the reliability and durability of the activation system and the ejection assembly. There may also be an electrically insulating layer between the activation mechanism and the barrier portion.

In some example arrangements, the ejection assembly may comprise an ejection capsule containing ejection propulsion material, and an anti-recoil capsule containing anti-recoil propulsion material. The ejection capsule and the anti-recoil capsules may be provided separately or attached to each other directly or indirectly, by an attachment component.

In some example arrangements, the ejection assembly may comprise an anti-recoil capsule, containing combustible anti-recoil propulsion material and a compensation body and/or a compensation liquid mass; the anti-recoil channel including an anti-recoil chamber for accommodating the anti-recoil capsule adjacent the second interface boundary of the barrier structure. The anti-recoil capsule may contain solid material that will be ejected together with the anti-recoil gas, which may have the effect of increasing the anti-recoil momentum and reaction force. The quantity and characteristics of the anti-recoil propellant material, and the configuration of the nozzle may be determined to achieve sufficient anti-recoil momentum to counter-balance the reaction force imparted by the ejection body.

In some example arrangements, the ejection assembly may comprise an ejection capsule, containing combustible ejection propulsion material and the ejection body; the ejection channel including an ejection chamber for accommodating the ejection capsule adjacent the first interface boundary of the barrier structure.

In some example arrangements, the anti-recoil channel may comprise a nozzle for increasing the speed of the anti-recoil gas pressure pulse before it exits the anti-recoil channel; the anti-recoil channel including a capsule chamber for housing an anti-recoil capsule, a convergent region for increasing the pressure of the anti-recoil gas, a divergent region for allowing the anti-recoil gas to expand, and a throat between the convergent region and the divergent region, the convergent region and the divergent region being in fluid communication with each other through the throat. In some examples, the anti-recoil gas may reach a supersonic speed after passing through the throat of the nozzle.

In some examples, anti-recoil propellant material contained within an anti-recoil capsule may comprise or consist essentially of solid combustible material. When ignited, the combustible material will rapidly combust and generate a pulse of anti-recoil gas (as a combustion product) that will expand through the anti-recoil channel and exit an open end of the anti-recoil channel.

In some example arrangements, an ejection channel may comprise a tube or pipe, at least a length of which may define an internal volume having a substantially circular transverse cross-section, or an oval or polygonal shape. The internal volume may be substantially cylindrical or substantially conical (or tapering); the internal volume may be substantially smooth or have a profile for modifying the movement of the ejection body (for example, to induce the ejection body to spin, or rotate about its direction of flight).

In some examples, the ejection channel or another part of the ejection assembly may be commercially available, thus enhancing the operating and configuration flexibility of the ejection system.

In some example arrangements, the ejection assembly may comprise a plurality of ejection channels. The ejection channels may be oriented in different directions to each other, operable to eject a plurality of respective ejection bodies in different directions.

In some example arrangements, the ejection assembly may comprise a plurality of channel bodies that can be connected to each other, each channel body comprising at least one ejection channel and/or anti-recoil channel. In some example arrangements, the ejection channel may comprise an ejection chamber for housing the ejection body prior to being ejected, and an ejection barrel for guiding the ejection body from the ejection chamber towards an open end of the ejection channel.

In some example arrangements, the ejection assembly may comprise a plurality of anti-recoil channels. The anti-recoil channels may be oriented in different directions to each other, arranged such that the combined effect of respective anti-recoil capsules in each of the anti-recoil channels being simultaneously engaged by respective anti-recoil activation mechanisms is to oppose the ejection reaction force along or about a plurality of axes of the ejection assembly. The respecting anti-recoil activation mechanisms for each anti-recoil channel may be independently controllable.

In some examples, a capability to activate multiple anti-recoil pressure pulses in different directions may have the aspect of opposing multiple ejection reaction force axial components, thus stabilizing the ejection assembly against recoil along multiple axes, or degrees of freedom. In other words, two or more anti-recoil channels may be used in an angle relationship to each other, such that the net effect is to achieve a two-vector force arrangement to compensate the ejection reaction force (that is, the vector sum of the anti-recoil reaction forces balances the ejection recoil reaction force or forces; there may be one or more ejection channels).

Various example ejection assemblies may be configured for ejecting various kinds of ejection bodies; for example, an ejection body may comprise a cannister containing dye for staining intruders for future identification, in which the ejection system may be part of an intruder detection system and be capable of ejecting a dye cannister towards an intruder, so that the intruder may be identified by the presence of the dye. Another example ejection assembly may be configured for ejecting an impact tool with sufficient force to bore or punch a hole into a structure such as a door or window. Another example ejection body may comprise or consist of a cannister capable of emitting smoke, gas or atomized liquid droplets. Some kinds of ejection bodies may need to be ejected having relatively high kinetic energy. Other example ejection bodies may include smoke cannisters, anchoring systems (such as harpoon-type anchoring systems), nets (for example, nets or other objects for disabling other UAV systems), or tracker devices (for example, GPS tracker devices that may be used by police to track vehicles).

Example ejection assemblies may be configured for ejecting ejection bodies having a range of diameters. For example, ejection bodies may have diameters of at least about 4 mm, and/or at most about 40 mm. For example, an ejection body may have a diameter of about 4.5 mm to about 5 mm. The mass of an ejection body may be at least about 2 g, and/or at most about 80 g. For example, an ejection body may have a mass of about 2 g, a diameter of about 4.6 mm diameter and a length of about 30 mm. Some ejection bodies may have a length of about 30 mm to about 40 mm. For example, an ejection assembly may be configured for ejecting the ejection body having a diameter of 2 mm to 50 mm, and a mass of 1 g to 100 g. In some examples, the ratio of the mass of the ejection body may be 1 to 40 times, or 1 to 10 times that of the anti-recoil matter ejected. In general, this ratio may be expected to be nearer the higher end of this range in use cases where the magnitude of the ejection velocity of the ejection body is relatively low, such as for smoke grenades having a diameter of about 40 mm.

The speed with which an ejection body exits an ejection channel may depend on the use case and/or on physical characteristics of the ejection body, such as its diameter and/or mass. For example, an ejection body may exit the ejection channel at a speed of at least about 70 m/s, and/or at most about 1,200 m/s; for example, up to 1,100 m/s. In general, the smaller the diameter of the ejection body, the higher may be the exit speed. For example, an ejection body of diameter about 4.5 mm and mass of about 2 g may have an exit speed of about 725 m/s; an ejection body of diameter about 5.5 mm and mass of about 3.5 g to 4 g may have an exit speed of about 1,100 m/s; an ejection body of diameter about 7.6 mm and mass of about 9.4 g to 11.7 g may have an exit speed of about 785 m/s; an ejection body of diameter about 9 mm and mass of about 4 g to 9.5 g may have an exit speed of about 300 to 580 m/s; and an ejection body of diameter about 40 mm and mass of about 30 g to 80 g may have an exit speed of about 70 m/s. For example, an ejection assembly may be configured for ejecting the ejection body from the open end of the ejection channel at a speed of 50 m/s to 1,500 m/s.

The ejection system may be configured such that the barrier structure can sustain a difference between the ejection reaction force and the opposing anti-recoil reaction force, integrated over a time period, does not exceed 450 N; and/or the difference between the ejection reaction force and the opposing anti-recoil reaction force, integrated over a time period may be no less than 10% of the weight of the ejection assembly (that is, no less than 10% of its mass×g, after the ejection).

The ejection assemblies may be configured such that the barrier can sustain a transient pressure difference of at least about 100 MPa, or at least about 200 MPa; and/or at most about 500 MPa, or at most about 450 MPa. The transient ejection gas pressure pulse may have a full width at half maximum (FWHM) of at least about 0.01 ms, or at least about 0.1 m/s, or at least about 0.5 ms; and/or at most about 2 ms, or at most about 1 ms. Example ejection assemblies may be configured such that the barrier can sustain a transient pressure difference of 100 MPa to 500 MPa between gas in the ejection channel and in the anti-recoil channel, for a period of 0.01 ms to 2 ms.

In general, and without wishing to be bound by a particular theory, the maximum pressure of the ejection gas pressure pulse is expected to be substantially lower than the maximum pressure of the anti-recoil gas pressure pulse, in use cases where the mass of the ejection body is substantially greater than the mass of the matter ejected in the anti-recoil channel.

In some example arrangements, the ejection channel may include an ejection chamber having a proximal end and a distal end, for accommodating the ejection capsule adjacent the first side, the proximal end of the ejection chamber disposed adjacent the first interface boundary of the barrier structure; and an ejection barrel having a proximal end and a distal end, the proximal end of the ejection barrel extending from the distal end of the ejection chamber and the distal end of the barrel being the open end of the ejection channel.

A computer program may be provided for automating the fine-tuning of the ejection and anti-recoil gas pressure pulses as respective functions of time. The computer program may be capable of receiving certain properties and/or a quantity of the ejection and anti-recoil propellant material as input, and calculating a suitable throat area for the nozzle using one-dimensional gas thermodynamics, for example. The computer programs may use the backward force exerted on the ejection system by the gases and the item exiting the front end of the ejection tube to calculate and provide as output a required Mach number at the exit of the divergent section of the nozzle. The computer program may then calculate a nozzle configuration using the axisymmetric method of characteristics to ensure an efficient and optimized expansion of the gas exiting the nozzle cartridge to the Mach number at the exit of the divergent section of the nozzle. If the backward force exerted on the ejection system by the gases and item exiting the front end of the ejection tube and the properties of the solid propellant used in the nozzle cartridge are known, the computer program can be used to generate a rocket engine configuration that will exert a forward force of equal magnitude on the ejection system. Therefore, the computer program may provide a quick and automated method of designing a recoilless ejection system for a large variety of items.

Substantially preventing pressure communication between the ejection and anti-recoil pressure pulses in the ejection channel and the anti-recoil channel, respectively, may have the aspect of allowing the ejection system and the anti-recoil system to be independently controlled. It may allow greater flexibility in selecting types, sizes and masses of ejection bodies in combination with various anti-recoil propulsion materials.

Example ejection assemblies may have the aspect of exhibiting improved stability against recoil in these and other example applications, allowing a series of ejection bodies to be ejected in relatively rapid succession, all with relatively high precision owing to the reduced recoil from the preceding ejection. Another potential aspect of some example ejection assemblies may be enhanced safety for operators, who may be located in relatively close proximity to the ejection assembly in operation.

In some example arrangements, an example ejection assembly may be mounted on a mobile vehicle or platform, such as an unmanned aerial vehicle (UAV), and attached to the UAV in fixed or moveable way. An unmanned aerial vehicle (UAV) is a device that can fly or hover without requiring a human pilot on board and some UAVs may be referred to as 'drones'. A UAV may provide an aerial platform on which various other kinds of devices, such as cameras or loudspeakers, can be mounted and operated. UAVs can be used for a wide variety of applications, including for example delivering aid to inaccessible or remote disaster areas, to disable or force down another UAV, or to interact in various ways with equipment or platforms on the ground or sea, or in the air. In some examples, an ejection assembly mounted on an UAV may be configured for ejecting packages containing food or medical equipment. In some examples, an ejection assembly mounted on a UAV may be configured for ejecting solid bodies, or liquid or gas phases of matter, that need to be ejected having relatively high kinetic energy, including smoke, anchoring systems (such as harpoon-type anchoring systems), nets (for example, nets or other objects for disabling other UAV systems), or tracker devices (for example, GPS tracker devices that may be used by police to track vehicles).

In some example arrangements, a UAV (including a relatively small UAV) may comprise a plurality of ejection assemblies mounted thereon. This may have the aspect of enabling a plurality of respective ejection bodies to be ejected substantially simultaneously towards a respective plurality of destination positions.

In some example arrangements, one or more example ejection assemblies may be mounted onto a relatively small UAV; for example, a UAV may have a diameter of about 40 cm to 100 cm; for example, about 60 cm; and/or a mass of about 0.5 kg to about 5 kg; for example, about 3 kg. A UAV may have several degrees of freedom of movement; for example, 6 degrees of freedom. Some example ejection assemblies may have the aspect of having a relatively low mass, which may make them suitable for use on UAVs; and/or being capable of ejecting bodies of various types, sizes and mass.

In some example arrangements, the net effect of the ejection and anti-recoil mechanisms may be that there is no visible effect on the position or movement of the platform (for example, the UAV) on which the ejection assembly is mounted.

Some example UAVs having example ejection systems capable mounted thereon may have the aspect of improved flight stability and operation capability when the ejection assembly is used. Example UAVs may be capable of carrying and storing more and/or heavier ejection bodies, and/or of carrying a device for rearranging ejection bodies in use.

An aspect of some example ejection systems may be to enable relatively small UAVs to be used in highly complex situations (for example, in security situations) with reduced operational limitations.

Some examples disclosed ejection systems may enable UAVs to be used in a relatively wide range of operational applications. Example applications may be in the fields of security applications.

The invention extends to any novel aspects or features described and/or illustrated herein.

Any apparatus feature as described herein may also be provided as a method feature, and vice versa.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
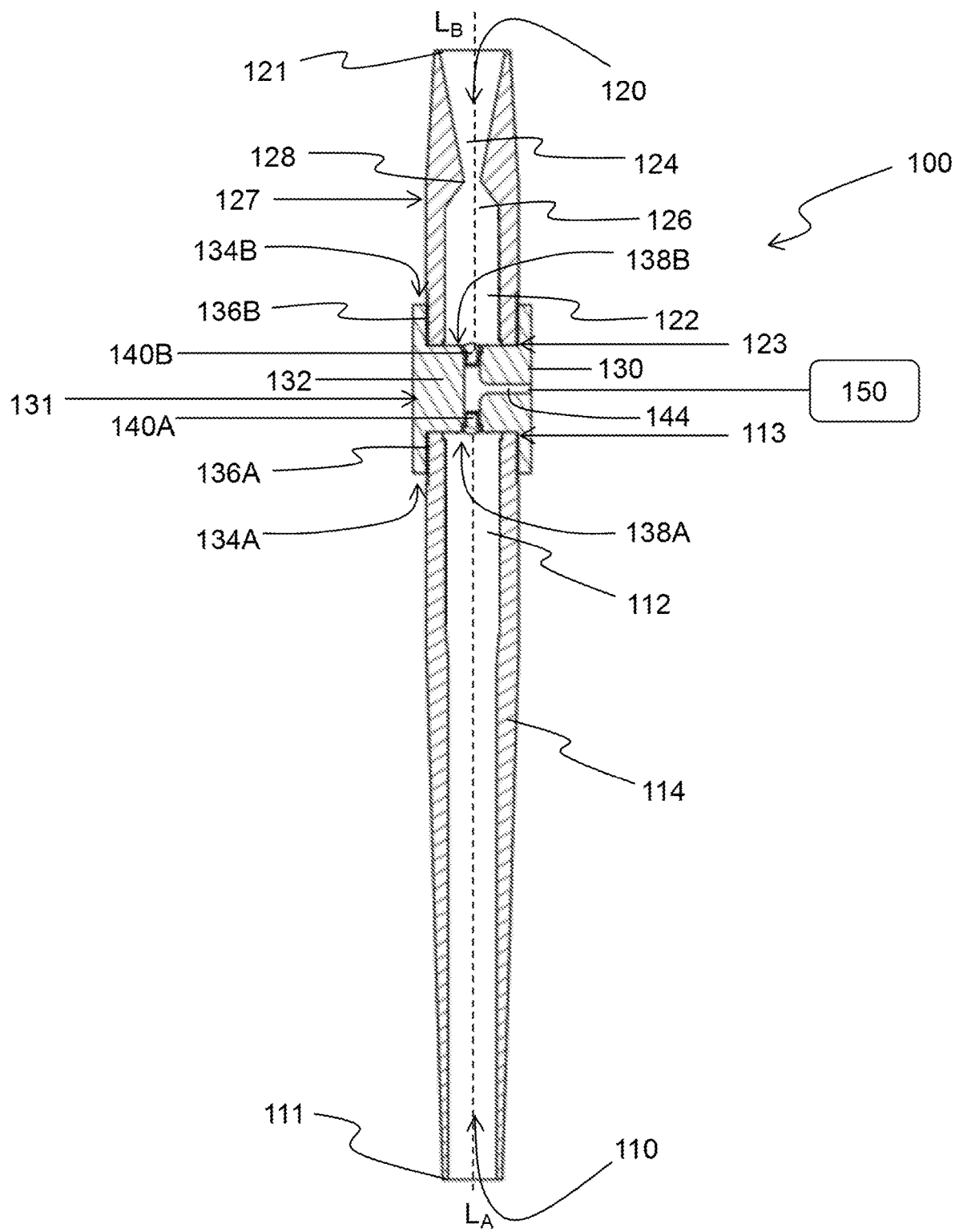
FIG. 1A shows a schematic longitudinal cross-section view of part of an example ejection assembly.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Figure 1B:
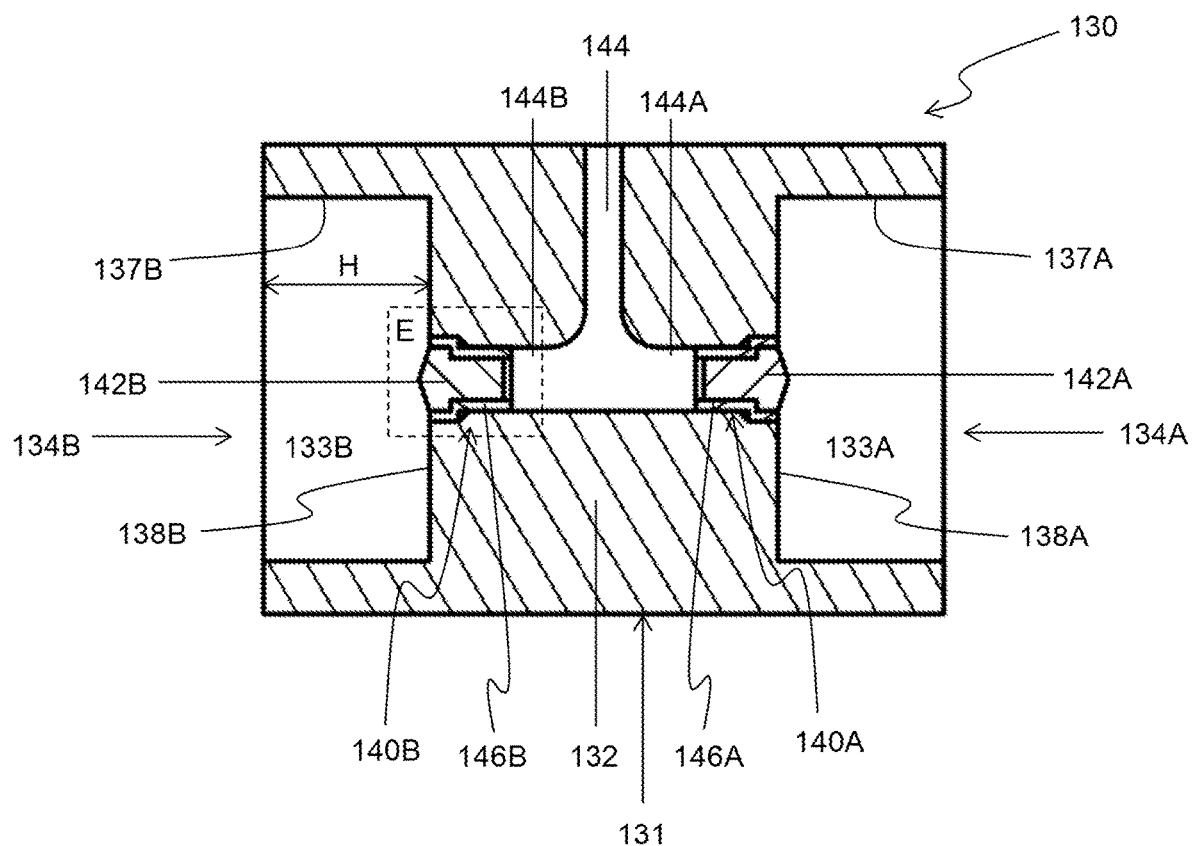
FIG. 1B shows a schematic longitudinal cross-section view of an example barrier structure.
Figure 1C:
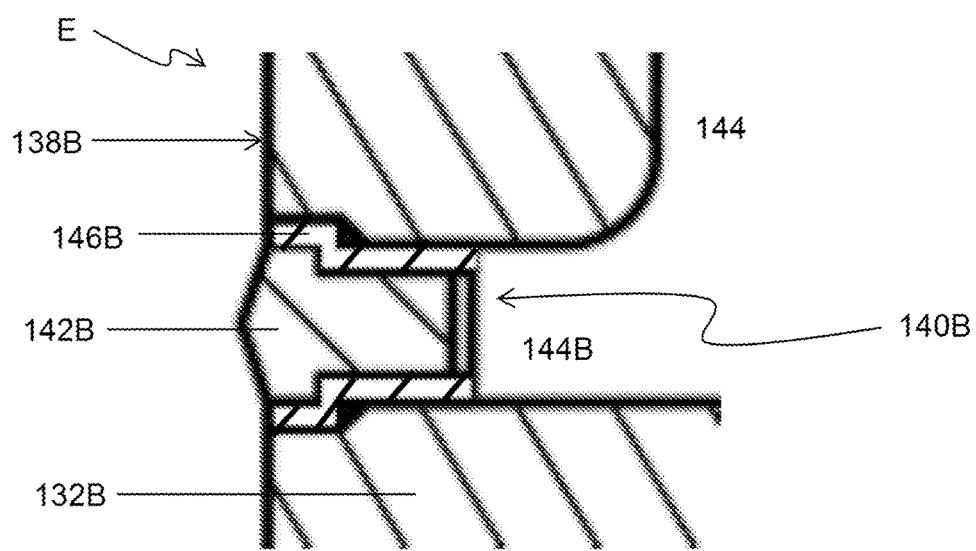
FIG. 1C shows an expanded drawing of part of the example barrier structure indicated by E in FIG. 1B.

With reference to FIGS. 1A to 1C, an example ejection assembly 100 comprises an ejection channel 110, a separable anti-recoil channel 120, a barrier structure 130 and an attachment mechanism 136A 136B that fastens the ejection channel 110 and the anti-recoil channel 120 to the barrier structure 130. The ejection channel 110 has a longitudinal axis LA, a proximal end 113 and an open distal end 111 (as used herein in relation to both the ejection channel 110, the anti-recoil channel 120 and capsules, 'proximal' refers to the end closest to the barrier structure 130 when assembled and 'distal' to the end remote from the barrier structure 130). The anti-recoil channel 120 has a longitudinal axis LB, a proximal end 123 and an open distal end 121, and comprises a nozzle portion 127, which will be described in more detail in later paragraphs. The ejection channel 110 comprises an ejection chamber 112 at its proximal end 113, for housing an ejection capsule (not shown), and a barrel portion 114 that extends from the ejection chamber 112 to its open distal end 111. The anti-recoil channel 120 comprises an anti-recoil chamber 122 for housing an anti-recoil capsule (not shown), and the nozzle portion 127 that extends from the anti-recoil chamber 122 to its open distal end 121.

The barrier structure 130 has a first side 134A and a second side 134B, which are arranged longitudinally opposite each other in this example, the first and second sides 134A, 134B being connected by a lateral side 131. The barrier structure 130 has a first interface boundary 138A on the first side 134A and a second interface boundary 138B on the second side 134B, and a barrier portion 132 between the first and second interface boundaries 138A, 138B. Each of the first and second sides 134A, 134B of the barrier structure 130 includes a respective first and second cylindrical recess 133A, 133B, for receiving and fastening the proximal end 113 of the ejection channel 110 and the proximal end 123 of the anti-recoil channel 120, respectively. The respective internal surface of each of the cylindrical recesses 133A, 133B is screw-threaded, providing respective screw-threaded internal surfaces 137A, 137B that each extends a longitudinal distance H from the respective first and second interface barriers 138A, 138B. The internal threaded surfaces 137A, 137B interconnect with mating threaded portions of the ejection and anti-recoil channels 110, 120 to form the attachment mechanism 136A, 136B, which will be described in detail in later paragraphs.

The barrier structure 130 houses an ejection activation mechanism 140A adjacent or coterminous with the first interface boundary 138A, and an anti-recoil activation mechanism 140B adjacent or coterminous with the second interface boundary 138B. Each of the ejection and anti-recoil strike mechanisms 140A, 140B comprises a respective strike element 142A, 142B (for example, a contact pin) arranged coaxially with the respective first and second recesses 133A, 133B and with the respective longitudinal axes LA of the ejection channel 110 and LB of the anti-recoil channel 120, when assembled. In this example, each strike element 142A, 142B may protrude slightly from the respective first and second interface boundary 138A, 138B.

Within the example barrier structure 130, each strike element 142A, 142B is partly enveloped by a respective resilient force-absorbent member 146A, 146B. The force-absorbent member 146A, 146B may comprise or consist essentially of a jacket 146A, 146B comprising one or more respective layers of resilient material. In some examples, electrically insulating material may be disposed between each contact pin 142A, 142B and the barrier portion 132, potentially increasing the reliability of an electrically activated activation mechanism 140A, 140B. The force-absorbent layer 146A, 146B can dampen the impact of the contact pins 142A, 142B on the barrier portion 132, and likely enhance the reliability and durability of the ejection assembly 100. In some example arrangements, the resilient member 146A, 146B may comprise a rubber O-ring and be disposed between the electrically insulating component and the barrier portion 132; and in some example arrangements, the resilient member and the electrically-insulating member may be provided as a single component comprising a single material that is both electrically-insulating and exhibits impact-damping characteristics. The sudden increase in gas pressures within the ejection and anti-recoil channels 110, 120 on activation will apply respective forces against the respective contact pins 142A, 142B, causing the force-damping resilient members 146A, 146B to be longitudinally compressed on both sides of the barrier portion 132. The presence of the force-absorbent jackets 146A, 146B or O-rings (or other resilient members) may substantially protect the contact pins 142A, 142B from damage.

The barrier structure 130 includes a duct 144 extending from the lateral side 131 of the barrier structure, and splits into ducts 144A, 144B that extend to the ejection strike mechanism 140A and the anti-recoil strike mechanism 140B, respectively. The ducting 144, 144A, 144B is configured for conveying electrical wires (not shown) from outside the barrier structure 130 to the respective activation mechanisms 140A, 140B. The wires may be connected to an external control system 150 for controlling the activation of the ejection and anti-recoil activation mechanisms 140A, 140B, particularly the timing of these activations. Contact pins 142A, 142B may be electrically connected to each other in series or in parallel, the latter arrangement allowing for a time delay to be introduced between the ignition of ejection propellant material and anti-recoil propellant material in respective capsules; and consequently, a time delay between the generation of the ejection gas pressure pulse and the anti-recoil gas pressure pulse. Both the ejection and anti-recoil activation mechanisms 140A, 140B can be independently activated or activated in a predetermined time relationship to each other, in response to receiving a respective ejection and anti-recoil signal conveyed by the ducted electrically conducting wires (not shown).

The attachment mechanism 136A, 136B of the ejection assembly 100 as a whole can be considered as comprising an ejection and an anti-recoil attachment sub-mechanism 136A, 136B. One of the attachment sub-mechanisms 136A fastens the proximal end 113 of the ejection channel 110 to the first side 134A of the barrier structure 130; and the other of the attachment sub-mechanisms 136B fastens the proximal end 123 of the anti-recoil channel 120 to the second side of the barrier structure 130. The proximal end 113 of the ejection channel 110 includes a screw-threaded region (not specifically shown), in which the screw threading mates with the screw-threading on the internal surface 137A of the recess 133A on the first side 134A of the barrier structure 130 to form the ejection attachment sub-mechanism 136A. Similarly, the proximal end 123 of the anti-recoil channel 120 includes a screw-threaded region (not specifically shown), in which the screw threading mates with the screw-threading on the internal surface 137B of the recess 133B on the second side 134B of the barrier structure 130, forming the anti-recoil attachment sub-mechanism 136B. In this example, the attachment mechanism 136A, 136B fastens each of the ejection channel 110 and the anti-recoil channel 120 to the first and second longitudinal ends 134A, 134B, respectively, of the barrier structure 130, such that the barrier portion 132 is secured in a fixed spatial relationship between the ejection and anti-recoil channels 110, 120.

An ejection capsule (not shown) for use with an example ejection assembly 100 illustrated in FIGS. 1A to 1C may comprise an encasement containing a primer material adjacent a proximal end of the capsule, propulsion material adjacent (or sufficiently close to) the primer material, and the ejection body adjacent, coterminous with, or projecting from, a distal end of the capsule. An example capsule (as the skilled person would understand) is configured to be inserted into the ejection chamber 112, its proximal end adjacent (or sufficiently close to) the first interface boundary 138A of the barrier structure 130, such that the activation mechanism 140A can engage the capsule and ignite the primer material. The proximal end of the capsule may be engaged mechanically, electrically, or electro-mechanically by the activation mechanism (specifically by a contact pin, for example), to ignite the primer, which will subsequently ignite the propulsion material. Once ignited, the propulsion material will produce a volume of combustion gas, the pressure of which should be sufficiently great to accelerate the ejection body (not shown) and drive it through the barrel 114, to exit the open end 111 of the ejection channel 110 at a desired ejection speed. The ejection gas pulse and the ejection of the ejection body will generate a reaction force on the ejection assembly 100 which, if not compensated, will cause the ejection assembly 100 to recoil.

An example anti-recoil capsule (not shown) may function in a similar, or substantially the same way, generating an anti-recoil reaction force on the ejection assembly 100 to oppose, or substantially compensate the ejection reaction force, thus reducing, or substantially eliminating recoil of the ejection assembly 100. Some example anti-recoil capsules may include a solid or liquid mass in addition to the anti-recoil propulsion material, and some may not. Such a solid or liquid mass may increase the anti-recoil reaction force and assist in reducing the recoil. The propulsion material in the ejection and anti-recoil capsules may be of the same type, or of different types. An example ejection capsule may comprise combustible powder located near a proximal end of the ejection capsule, to be placed against or sufficiently near the first interface boundary 138A (and an ejection contact pin 142A, for example); and the anti-recoil capsule (not shown) may comprise solid propellant material located near a proximal end of the anti-recoil capsule, to be placed against or sufficiently near the second interface boundary 138B of the barrier structure 130 (and an anti-recoil contact pin 142B, for example).

In example arrangements where the anti-recoil channel 120 includes a nozzle portion 127, the nozzle portion 127 can increase the speed with which the anti-recoil gas is emitted from the distal end 121 of the anti-recoil channel 120. The nozzle portion 127 may include a convergent portion 126, a throat 128 and a divergent portion 124, in which the convergent portion 126 and the divergent portion 124 are connected in fluid communication by the throat 128. In the illustrated example, the mouth of the divergent portion 124 is coterminous with the open distal end 121 of the anti-recoil channel 120. In some example arrangements, the convergent portion 126, divergent portion 124, the throat 128 and the anti-recoil capsule chamber 122 of the anti-recoil channel 120 may be provided as a single, continuous component, or as separate components that can be assembled for use.

Within the anti-recoil channel 120, hot combustion gases generated by the ignition and combustion of anti-recoil propulsion material within the anti-recoil capsule chamber 122 provide a gas pressure pulse that will be forced to converge in the convergent portion 126 and will subsequently expand in the divergent portion 124. This can significantly increase the speed of the gas depending on the design of the nozzle portion 127, before the gas exits the open distal end 121 of the anti-recoil channel 120. The anti-recoil gas velocity will generally be subsonic within the anti-recoil capsule chamber 122 and accelerate as the gas is forced to converge in the convergent portion 126. The dimensions of the nozzle throat 128 may be designed based on the quantity and characteristics of the anti-recoil propellant material to be used and may be selected to accelerate the gas to Mach 1 (the speed of sound in air at the temperature of the air) at the longitudinal point of the nozzle where the cross-section of the throat 128 is smallest. A Mach number depends on the fluid properties; in this case, Mach 1 will be specific to the gas used and depends on the temperature achieved in the chamber. Beyond this point, the hot anti-recoil gas enters the divergent portion 124 the anti-recoil channel 120, and its speed may increase to greater than that of sound, depending on the configuration of the nozzle; for example, the anti-recoil gas may reach speeds of Mach 2, 3, 4, 5, or higher. A very high velocity of the gas exiting the divergent portion 124 of the nozzle portion 127 may generate a large amount of thrust, or anti-recoil reaction force, which can be selected to match the reaction force generated by the ejection of the ejection body. By selecting the amount and type of anti-recoil propulsion material, and by suitably configuring the anti-recoil channel, the combination of the magnitude and time characteristics of the anti-recoil reaction force may result in the anti-recoil reaction force being substantially the same as that of the ejection of the ejection body, but in opposite directions (potentially along or about more than one axis), resulting in minimal, or substantially negligible recoil of the ejection assembly 100 in use.

The barrier portion 132 of the barrier structure 130 is configured to have sufficient mechanical strength and rigidity to resist substantial deformation in response to the ejection gas pressure pulse and the anti-recoil gas pressure pulse, each on their own or simultaneously. The barrier structure 130, including the barrier portion 132, will prevent substantial fluid communication between the ejection and anti-recoil channels 110, 120. An effect of the barrier structure 130, particularly the barrier portion 132, is to separate the ejection and anti-recoil channels 110, 120 as distinct, separate pressure zones under the conditions of the gas pressure pulses in each channel, as in use. At least the barrier portion 132 of the barrier structure 130 may comprise or consist essentially of strong, tough and/or hard metal such as, but not limited to, steel, titanium or brass. In other words, the barrier portion 132 prevents the ejection gas pressure pulse and the anti-recoil pressure pulse from communicating with each other. In general, the gas pressure will rise and fall on opposite sides of the barrier portion 132 according to different pressure-versus-time response curves.

Figure 2A:
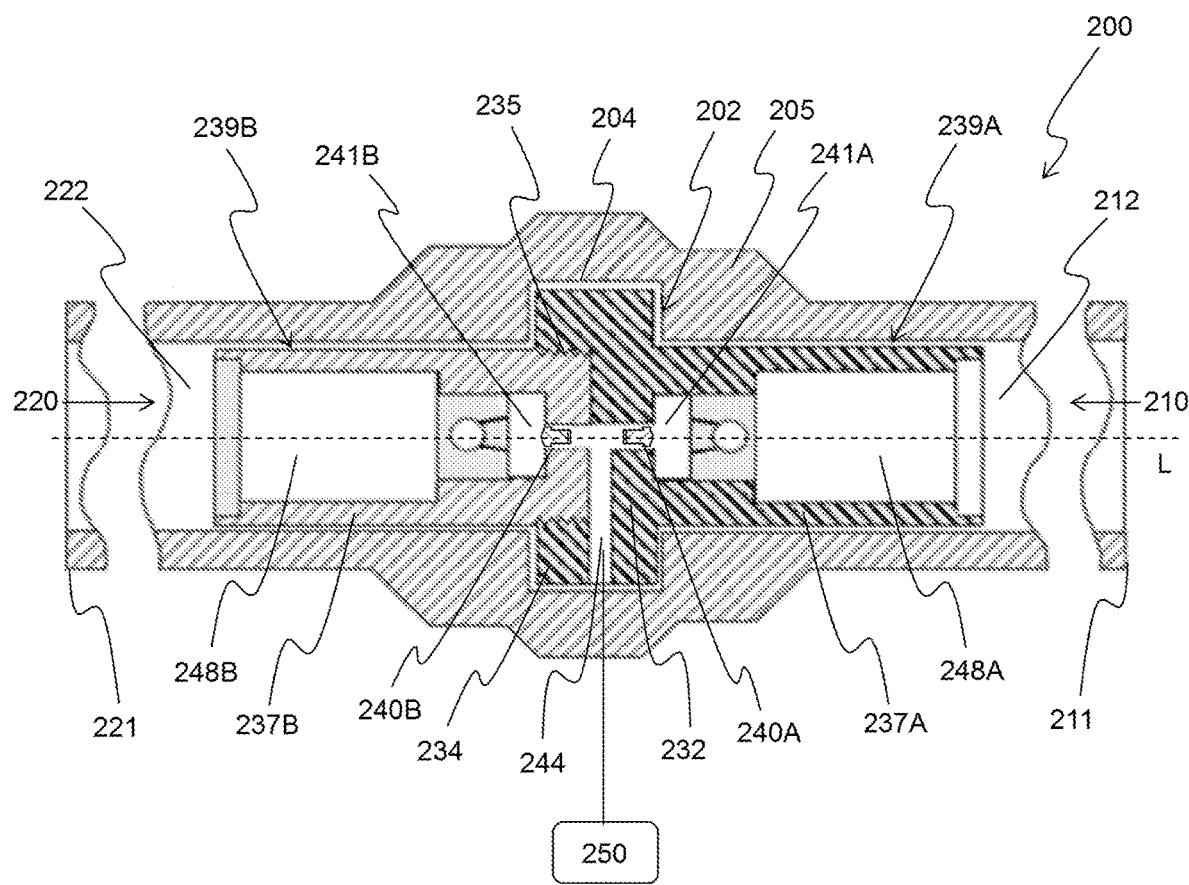
FIG. 2A shows a schematic longitudinal view of part of an example ejection assembly, including an example barrier structure within a chamber of a channel structure, between an ejection channel and anti-recoil channel (the ejection and anti-recoil channels are shown with the respective central portions omitted).
Figure 2B:
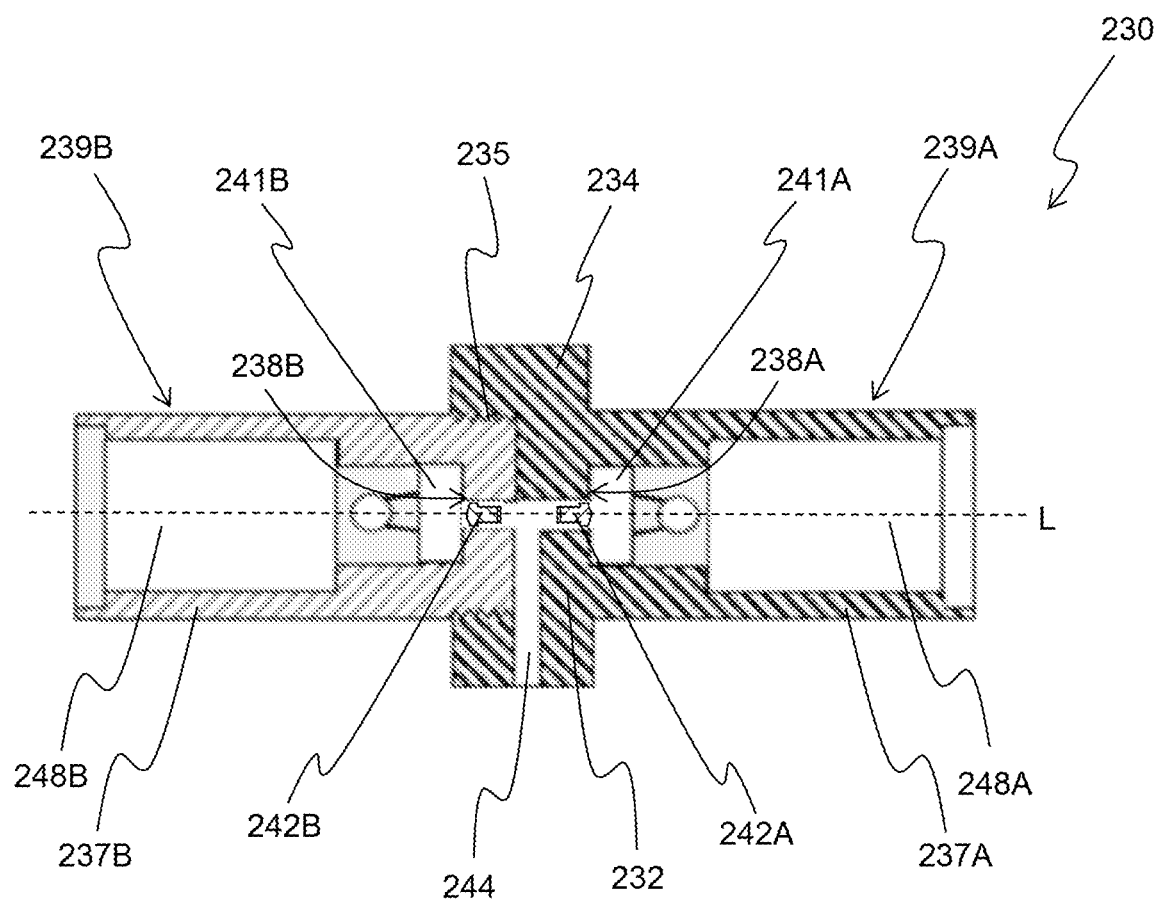
FIG. 2B shows the barrier structure of FIG. 2A, without the channel structure.
Figure 2C:
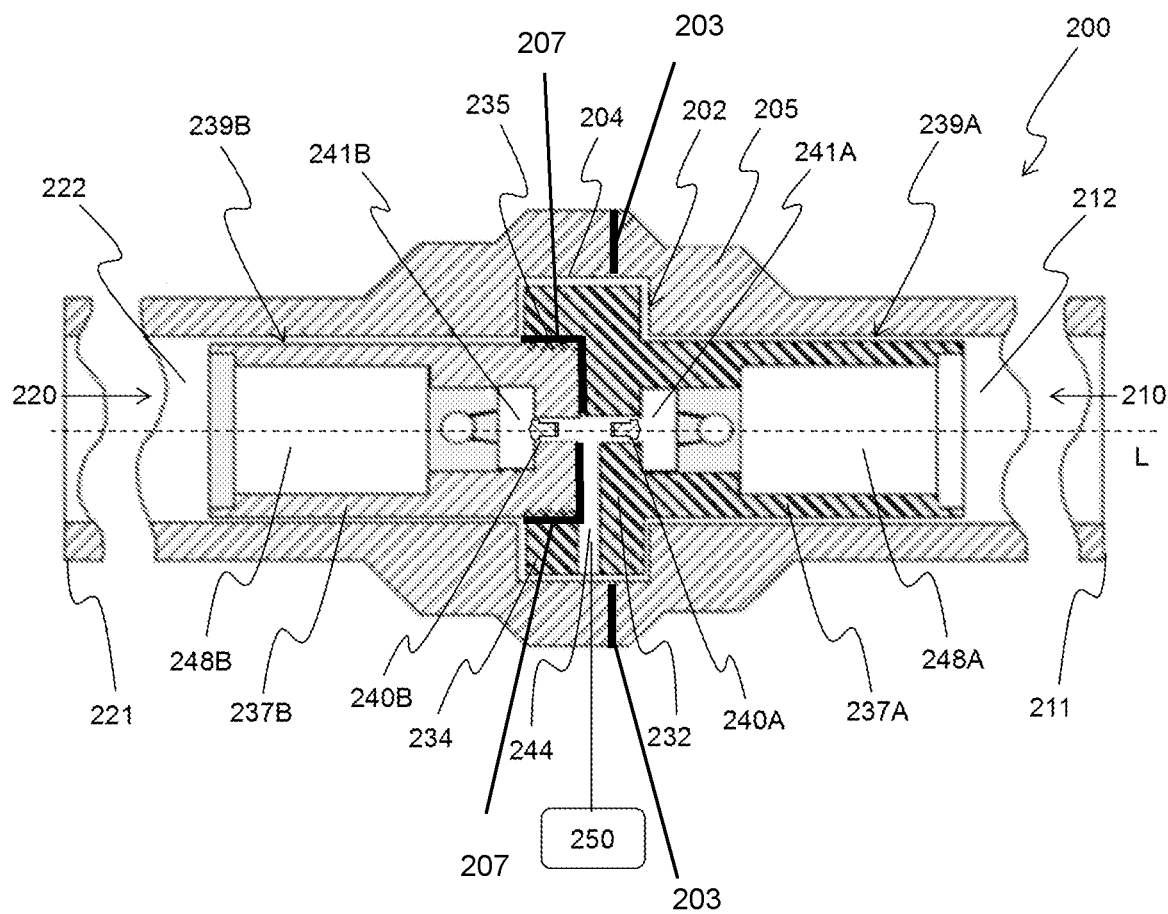
FIG. 2C shows an alternative schematic longitudinal view of part of an example ejection assembly to that of FIG. 2A, including an example barrier structure within a chamber of a channel structure, between an ejection channel and anti-recoil channel (the ejection and anti-recoil channels are shown with the respective central portions omitted).

A different example arrangement of an ejection assembly 200 is illustrated in FIGS. 2A, 2B and 2C. In this example, FIG. 2A illustrates the ejection channel 210 and the anti-recoil channel 220 are provided as respective portions of a unitary channel body 205, and a barrier chamber 202 between the ejection and anti-recoil channels 210, 220 for accommodating a barrier structure 230. In other words, this example channel assembly 200 comprises a single channel body 205 including the ejection and anti-recoil channels 210, 220, without requiring a connection member to connect the ejection and anti-recoil channels 210, 220 to each other. FIG. 2C shows a variant in which the ejection channel 210 and the anti-recoil channel 220 are joined together by a threaded connection 203 and an electrically insulating member 207 is provided between an ejection capsule 239A and an anti-recoil capsule 239B, so that there is no electrical connection between the ejection capsule 239A and the anti-recoil capsule 239B merely as a result of them being attached together by a screw thread. The ejection and anti-recoil channels 210, 220 extend from the barrier chamber 202 in opposite directions, having respective opposite open ends 211, 221. In other examples, the ejection and anti-recoil channels 210, 220 may be fastened to each other by an attachment mechanism (not shown).

In the illustrated example, the barrier structure 230 includes both an ejection capsule 239A and an anti-recoil capsule 239B, and a barrier portion 232 between them. The barrier structure 230 has a longitudinal axis L, with which the ejection capsule 239A, the anti-recoil capsule 239B and the barrier portion 232 are coaxial, the barrier portion 232 being disposed between the ejection and anti-recoil capsules 239A, 239B. The barrier structure 230 houses respective ejection and anti-recoil activation mechanisms 240A, 240B, and includes a first interface boundary 238A and a second interface boundary 238B. At the first interface boundary 238A, the ejection activation mechanism 240A interfaces with the ejection capsule 239A, such that the ejection activation mechanism 240A can engage the ejection capsule 239A in response to receiving an ejection signal and ignite primer material 241A within the ejection capsule 239A. At the second interface boundary 238B, the anti-recoil activation mechanism 240B interfaces with the anti-recoil capsule 239B, such that the anti-recoil activation mechanism 240B can engage the anti-recoil capsule 239B in response to receiving an anti-recoil signal and ignite primer material 241B within the anti-recoil capsule 239B. Both the ejection and anti-recoil activation mechanisms 240A, 240B comprise a respective electrically-operated contact pin 242A, 242B (shown in FIG. 2B), each contact pin 242A, 242B exposed respectively at the first interface boundary 238A and the second interface boundary 238B. The barrier portion 232 may include ducting 244 for conveying electrical wiring (not shown) connected to the ejection and anti-recoil activation mechanisms 240A, 240B at one end of the wires and to an external triggering control system 250 at the other end. The wires carry ejection and anti-recoil signals to activate the ejection and anti-recoil activation mechanisms 240A, 240B (in other examples, the ejection and/or anti-recoil signals may be in a form other than electrical and conveyed in media other than electrically conducting wire; for example, the signals may be in the form of light signals conveyed by optical fiber, or in the form of electromagnetic radiation).

Each of the ejection and anti-recoil capsules 239A, 239B includes respective primer material 241A, 241B, disposed adjacent, or sufficiently near the respective first and second interface boundary 238A, 238B so that it can be ignited by the respective contact pin 242A, 242B (or other ignition means). In addition, each of the ejection and anti-recoil capsules 239A, 239B contains respective propulsion material 248A, 248B, which will be ignited by the ignited primer material 241A, 241B and generate respective combustion gas pressure pulses in the ejection channel 210 and the anti-recoil channel 220, respectively. The ejection capsule 239A includes an ejection encasement 237A that contains the ejection primer material 241A and the ejection propulsion material 248A; and the anti-recoil capsule 239B includes an anti-recoil encasement 237B that contains the anti-recoil primer material 241B and the anti-recoil propulsion material 248B. The ejection encasement 237A also includes the barrier portion 232, formed as a relatively thick portion of the ejection encasement 237A. In this example, the barrier structure 230 includes an attachment mechanism 235 for fastening the anti-recoil capsule 239B to the ejection capsule 239A by means of mating screw threading.

In this example, the barrier portion 232 includes an annular flange portion 234 that projects radially from the barrier structure 230, shown separately in FIG. 2B. The barrier chamber 202 of the channel body 205 includes an annular recess for receiving the annular flange 234, thus fastening the barrier structure 230, particularly the barrier portion 232, to the channel body 205, in a fixed relationship to the ejection and anti-recoil channels 210, 220. When the barrier structure 230 (assembled by the anti-recoil capsule 239B being fastened to the ejection capsule 239A by the threaded attachment mechanism 235) is fastened to the channel body 205 as in use, the ejection capsule 239A projects into an ejection chamber 212 within the ejection channel 210, and the anti-recoil capsule 239B projects into an anti-recoil chamber 222 within the anti-recoil channel 220. Thus, the barrier portion 232 is held within the barrier chamber 202, such that the barrier portion 232 cannot move substantially in response to a pressure difference between the pressures on the ejection channel 210 side and on the anti-recoil channel 220 side of the barrier portion 232. In other words, any difference between the pressure-versus-time responses within the ejection and anti-recoil pressure zones will be transferred via the barrier portion 232 to the channel body 205.

Figure 3:
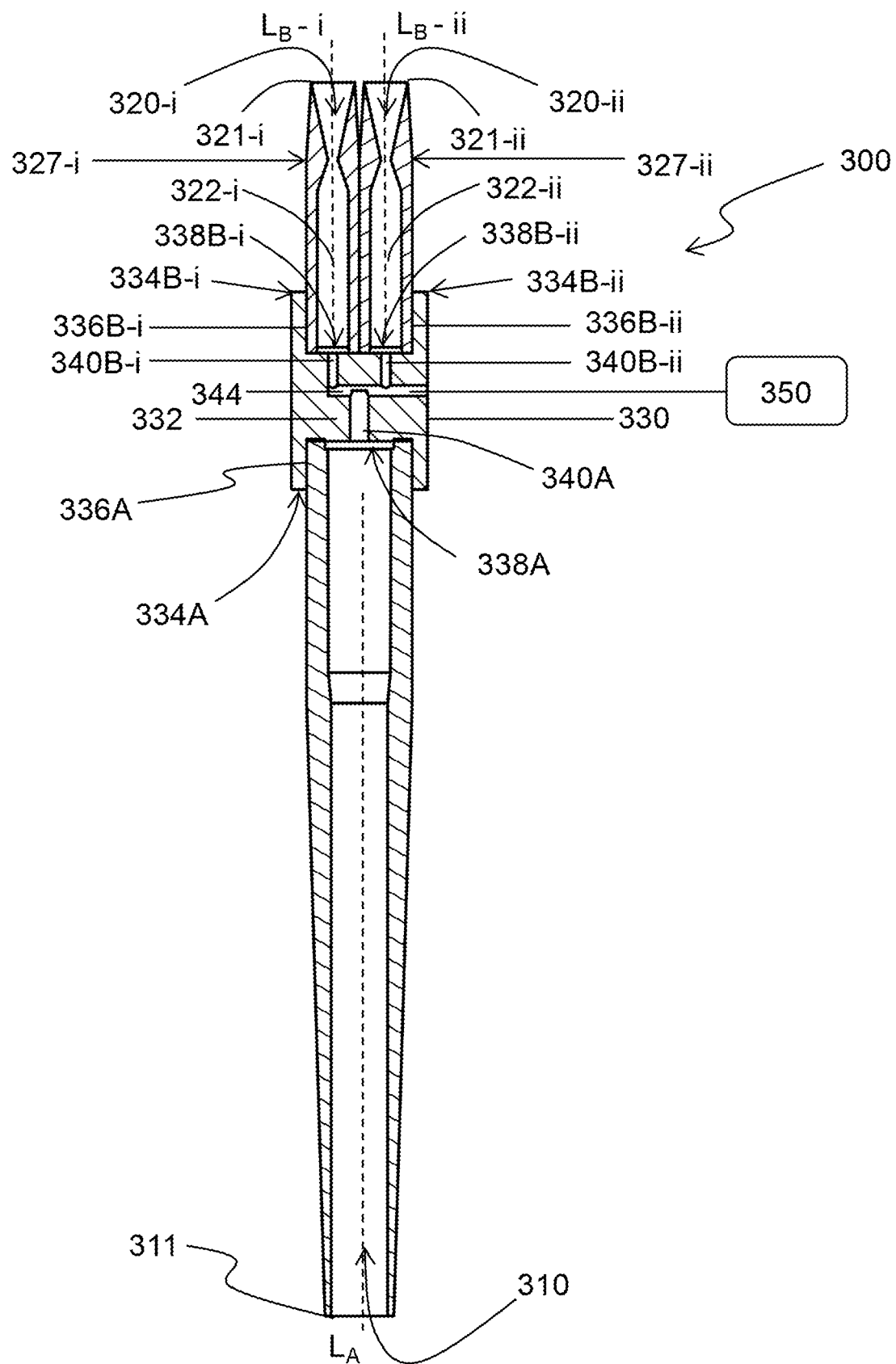
FIG. 3 shows a schematic longitudinal cross-section view of an example ejection assembly comprising one ejection channel and two parallel anti-recoil channels.
Figure 4:
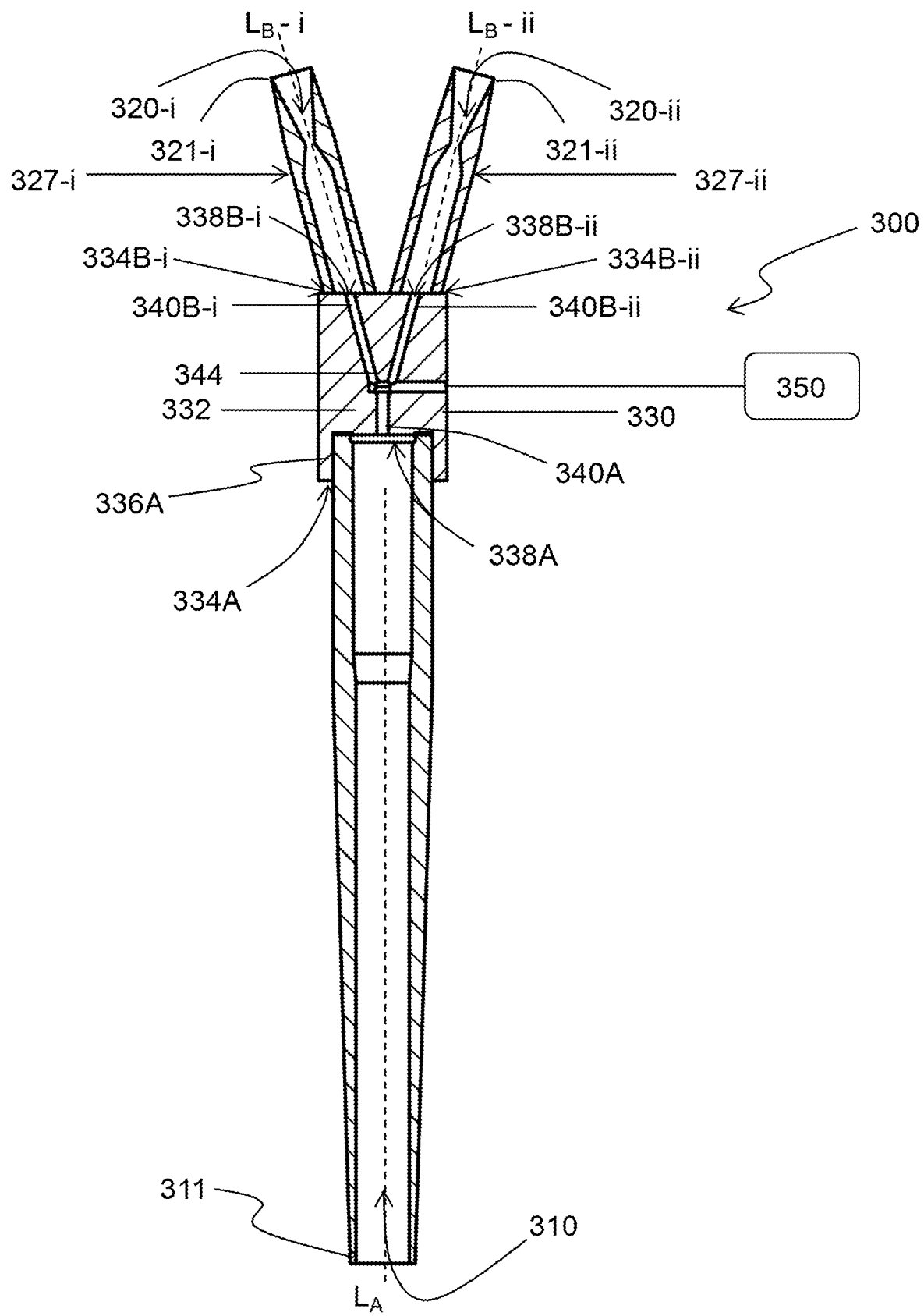
FIG. 4 shows a schematic longitudinal cross-section view of an example ejection assembly comprising one ejection channel and two diverging anti-recoil channels.

With reference to FIGS. 3 and 4, some example channel assemblies 300 may comprise two or more anti-recoil channels 320-*i*, 320-*ii* and one or more ejection channel 310. The ejection channel 310 and two anti-recoil channels 320-*i*, 320-*ii* are connected to each other substantially rigidly by means of a barrier structure 330. Each anti-recoil channel 320-*i*, 320-*ii* includes a respective capsule chamber 322B-*i*, 322B-*ii* for housing respective anti-recoil capsules. The barrier structure 330 has a first interface boundary 338A on a first side 334A, as well as a second and third interface boundary 338B-*i*, 338B-*ii* on a generally opposite second side 334B of the barrier structure 330. The first side 334A of the barrier structure 330 includes a threaded attachment mechanism 336A for fastening the ejection channel 310, and the second side 334B includes a threaded attachment mechanism 336B for fastening a pair of anti-recoil channels 320-*i*, 320-*ii* to the barrier structure 330. The pair of anti-recoil channels 320-I, 320-*ii* are potentially fastened to each other, or may be formed as a unitary structure. The barrier portion 330 may include ducting 344 for conveying electrically conducting wires (not shown) from an external control system 350 to respective activation mechanisms 340B-*i*, 340B-*ii* at the respective anti-recoil interface boundaries 338B-*i*, 338B-*ii*, and to an ejection activation mechanism 340A at the first interface boundary 338A.

In the example arrangement shown in FIG. 3, the central longitudinal axis LA of the ejection channel 310 and the longitudinal axes LB-*i*, LB-*ii* of the two anti-recoil channels 320-*i*, 320-*ii* are substantially parallel to each other. In the example arrangement shown in FIG. 4, the central longitudinal axes LB-*i*, LB-*ii* of the anti-recoil channels 320-*i*, 320-*ii* are disposed at an angle of about 30° to each other, each being disposed at 15° to the central longitudinal axis LA of the ejection channel 310.

The relative disposition of two or more anti-recoil channels may have the aspect of allowing the anti-recoil reaction forces to be fine-tuned to improve the balance between the ejection and anti-recoil reaction forces in more than one axis and degree of freedom. For example, angling the anti-recoil channels (at an angle of greater than 0°) to each other may allow anti-recoil components parallel and perpendicular to the ejection channel longitudinal axis. The sum of the perpendicular components of the anti-recoil channels may be substantially zero. Similar considerations should apply to example arrangements comprising two or more ejection channels.

Figure 5:
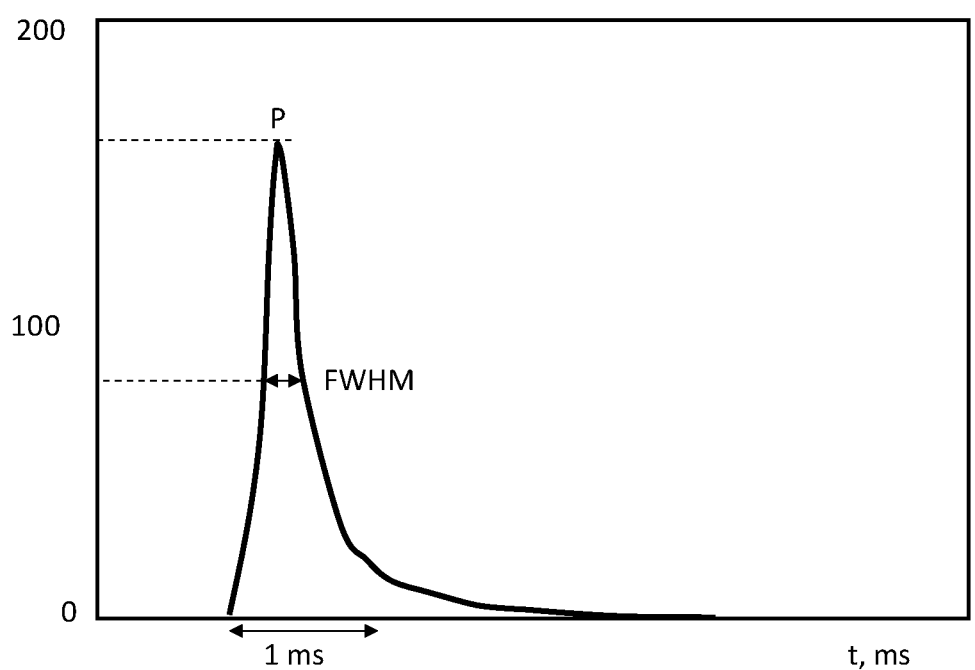
FIG. 5 shows a schematic example ejection gas pressure pulse.

FIG. 5 shows an example of an ejection gas pressure pulse, produced by the ignition and combustion of ejection propulsion material within an ejection capsule, and which can drive an ejection body through the ejection channel 110 to exit the open end 111 of the ejection channel 110. The example pressure pulse has a peak pressure of about 170 MPa, and the curve appears to be substantially log-normal, having a full width at half maximum (FWHM) of approximately 0.2 ms (milliseconds) to about 0.3 ms. The barrier structure 130 is configured such that the barrier portion 132 will isolate the anti-recoil channel 120 from this pressure pulse. An anti-recoil pressure pulse produced in the anti-recoil channel 120 may have a similar form to, or a different form from, the ejection pressure pulse. The ejection and anti-recoil activation mechanisms 140A, 140B can be independently controlled in some example arrangements, to minimise recoil on the ejection assembly by taking into account at least the peak pressures, curve shapes and widths of the ejection and anti-recoil gas pressure pulses.

In various examples, the peak ejection gas pressure may be about 400 MPa for a metal ejection body of diameter about 4.5 mm; about 430 MPa for a metal ejection body of diameter about 5.5 mm; about 430 MPa for a metal ejection body of diameter about 5.5 mm; about 415 MPa for a metal ejection body of diameter about 7.6 mm; about 235 MPa for a metal ejection body of diameter about 9 mm; and about 100 MPa for a metal ejection body of mass about 12 g.

While wishing not to be bound by a particular theory, the reaction force arising from the ejection of the ejection body from the ejection channel is expected to be approximately proportional to the square root of the diameter of the ejection body (which will be substantially the same as, or slightly less than, the diameter of the ejection channel), all else being equal and disregarding friction between the ejection body and the ejection channel for simplicity. In practice, the length of the ejection body and the velocity of the ejection body travelling through the ejection channels is expected to be relevant. The ejection body will be driven through the ejection channel by combustion of the ejection propulsion material and consequently generating substantial gas pressure between the barrier portion and the ejection body until the ejection body has been ejected from the ejection channel. In practice, frictional force between the ejection body and the internal surface of the ejection channel is expected to arise and generate a counteracting (negative) recoil reaction force. Since a solid body is not ejected from the anti-recoil channel in disclosed examples (that is, substantially only anti-recoil gas is ejected from the anti-recoil channel or channels), the dimensions of the anti-recoil channel are not expected to be directly related to the diameter of the ejection body. Other factors generally influence the configuration and dimensions of the anti-recoil channel, such as a potential requirement for the anti-recoil gas to reach Mach 1 at the nozzle throat (that is, the smallest cross-section of the convergent portion of the nozzle), which is expected to limit the mass-flow rate of the gas and allow the gas speed to be supersonic beyond the throat.

In various example arrangements that comprise two or more ejection channels, respective ejection activation mechanisms or primer caps (which may be considered to be ignition units) for igniting the ejection and anti-recoil propulsion materials may be connected to each other in series or in parallel. Series connection may allow the substantially simultaneous ejection of ejection bodies within respective ejection channels, while parallel connection may allow one or more predetermined delay(s) between the ejection of ejection bodies. A software-based approach may be used with series connection and hardware-based approach may be used with parallel connection.

Some example ejection assemblies may comprise one or more micro-controller unit(s), which may include one or more computer processor(s), to control the timing of (and potential delays between) the ejection of the ejection bodies, in which delays between ejections may be limited by the order or magnitude of the operating frequency of the controller unit. Since the ejection and anti-recoil mechanisms may be capable of operating on millisecond time scales, the operating frequency of the micro-controller unit may fall within the megahertz to gigahertz range. This may provide a substantially precise means for selecting the timings of the ejections, which may be enabled by a capability to select controller operating parameters.

Some example ejection assemblies may not include or require a micro-controller unit for controlling time delays between ejections, and instead use the propagation or gate delay of one or more logic circuit(s). A delay may comprise the time taken for the head of a signal to pass from a sender to a receiver comprised in an electronic circuit. An example logic gate may have a delay in the nanoseconds (10-9 s) to picoseconds (10-12 s) range. Therefore, using consecutive gates having a fixed time delay may provide a means of finely controlling delay time periods by means of an electronic circuit rather than (or in combination with) a computer executable controller program.

To achieve practically negligible, or substantially zero, recoil of an ejection assembly and in use, the time-dependence of the magnitudes of the ejection and anti-recoil gas pressures and consequent forces are balanced against each other. This may be achievable by carefully selecting a combination of the type of ejection and anti-recoil propellant materials (which may be the same or different) and the design the anti-recoil nozzle. Thermodynamic relations, supersonic flow diagrams and computational fluid dynamics may be helpful for doing this. For example, the mass, combustion rate, gas density and other properties and behaviors of potential propellant materials, which may be well-known and/or measured, may need to be taken into account. Once a suitable propellant material has been selected, suitable configuration and dimensions of the anti-recoil channel may be determined by means of computation, experimentation or a combination of computation and experimentation. Selection of the mass and type of propellant material and the design of an anti-recoil channel (including a nozzle) may be optimized cooperatively for improved efficiency. Therefore, an anti-recoil nozzle can be designed depending on characteristics (for example, mass and dimensions) of the ejection body, so that an anti-recoil force can counter-balance the reaction force of the ejection body, while aiming to minimise the overall mass of the ejection assembly.

The behavior of an example ejection assembly in use depends on various factors, including the time-dependences of the ejection and anti-recoil gas pressures and the ejection reaction force. A test apparatus can be provided to measure the recoil of ejection assemblies during a development phase, to provide a design that can minimise recoil in use. A test apparatus may comprise one or more force sensor(s) and/or accelerometer(s) and/or other devices for measuring an ejection reaction force (recoil force).

An example test apparatus may comprise a force sensor located at a proximal (rear) end, in contact with a test platform. A trial ejection assembly may be moveably mounted on the test apparatus such that its movement relative to the platform is substantially unrestrained along a longitudinal axis; movement of the trial ejection assembly may be substantially constrained along other axes, such as laterally. In other words, the trial ejection assembly may be substantially free to move in a forward-backward direction (that is, along an axis connecting the proximal and distal ends of the platform). For example, the trial ejection assembly may be mounted onto one or more rails, resting freely with as little sliding friction as possible along the longitudinal axis of the rail, but prevented from moving laterally.

The test apparatus may comprise one or more proximal buffer stops behind the trial ejection assembly to restrict backward movement; that is, a buffer stop may be attached to the platform on the opposite side from that which a test body will be ejected. One or more force sensors may be mounted on the proximal buffer stop or stops, the text apparatus being configured such that the distal (rear) end of the test ejection assembly can abut the force sensor(s) just prior to the test, before the test body is ejected. When test propulsion material is activated to eject the test body from the ejection channel, the reaction force will cause the test ejection assembly to apply a force to the force sensor(s), such that the recoil force can be measured. Using more than one (for example, two) force sensors may reduce the risk of measurement error owing to slight misalignment of the arrangement, for example. An example test apparatus may also comprise one or more distal stop buffer(s) against which a front (distal) end of the trial ejection assembly can abut, and one or more force sensor(s) may be mounted onto the distal buffer stop(s). In trials where the anti-recoil force exceeds the ejection recoil force, the net recoil will urge the trial ejection assembly against the distal force sensor(s). Such example arrangements can enable the net forward (distal) or backward (proximal) recoil force of trial ejection assemblies to be measured, allowing the characteristics of the propulsion materials and anti-recoil nozzles to be optimized for a type of ejection body, having a certain mass, length, diameter, for example.

A test arrangement may include providing one or more pressure sensor(s) within the ejection and/or anti-recoil channels, to measure the gas pressure pulse(s); that is, the time-dependent magnitude of the gas pressure in one or more channel(s). Measured pressure information may enable the channel assembly to be configured to withstand the stresses generated in use. A pressure sensor may be introduced into an anti-recoil channel as well as an ejection channel, for optimizing the anti-recoil channel and the ejection channel. In addition, means for measuring the exit flow speed, and/or temperature of anti-recoil gas, and/or or high-speed image recording means may further improve the ability to optimize the design of an ejection assembly.

Suitable combinations of chemical compositions and masses of ejection and anti-recoil propellant material can be determined by a combination of experimentation and calculation. For example, a process of optimizing this combination may include: mounting an example ejection assembly onto a moveable platform, ejecting an ejection body from the ejection assembly using a first mass of a first type of propellant material, measuring the recoil of the platform, and determining a thrust balance on the basis of the nozzle effect. This approach may have the aspect of providing an improved combination of thrust and balance.

Some example ejection assemblies may have the aspect of allowing various masses and types of ejection bodies to the ejected without recoil of the ejection assembly, as a consequence of separating the ejection and anti-recoil channels into non-communicating pressure zones by means of a substantially rigid barrier. A multi-use, substantially recoilless ejection system for small UAV (unmanned aerial vehicle) or other platforms can be provided.

The disclosed systems and methods have been described herein by way of example, and modifications of certain specific features or combinations of features can be made within the scope of the invention. Reference numerals appearing in the claims are for illustration only and have no limiting effect on the scope of the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. An ejection assembly, for ejecting an ejection body, comprising:
    an ejection channel having an open end, for conveying an ejection gas pressure pulse and the ejection body to exit the distal open end;
    an anti-recoil channel having an open end, for conveying an anti-recoil gas pressure pulse to exit the distal open end;
    a barrier structure having a first interface boundary and a second interface boundary , including a barrier portion between the first interface boundary and the second interface boundaries;
    an attachment mechanism for fastening the barrier structure between the ejection channel and the anti-recoil channel, the open end of the ejection channel disposed opposite and remote from the first interface boundary, and the open end of the anti-recoil channel disposed opposite and remote from the second interface boundary;
    characterized in that:
        an ejection activation mechanism is housed within the barrier structure adjacent the first interface boundary, operable to initiate, in response to receiving an ejection signal, combustion of ejection propulsion material contained in an ejection capsule placed adjacent the first interface boundary and thus producing the ejection gas pressure pulse for driving the ejection body through the ejection channel to exit the distal open end;
        an anti-recoil activation mechanism is housed within the barrier structure adjacent the second interface boundary, operable to initiate, in response to receiving an anti-recoil signal, combustion of anti-recoil propulsion material contained in an ejection capsule placed adjacent the second interface boundary and thus producing the anti-recoil gas pressure pulse; and wherein the barrier portion prevents pressure communication between the ejection gas pressure pulse in the ejection channel and the anti-recoil gas pressure pulse in the anti-recoil channel.

2. The ejection assembly, as claimed in claim 1, wherein: the attachment mechanism, further comprising:

an ejection channel connection mechanism for fastening the ejection channel to a first side of the barrier structure, adjacent the first interface barrier;

an anti-recoil channel connection mechanism for fastening the anti-recoil channel at a second side of the barrier structure, adjacent the second interface barrier; and the barrier portion disposed between the ejection channel and anti-recoil channel.

3. The ejection assembly as claimed in claim 1, wherein: the barrier structure, further comprising:

an ejection capsule containing the ejection propellant material, adjacent the ejection activation mechanism at the first interface boundary; and an anti-recoil capsule containing the anti-recoil propellant material, adjacent the anti-recoil activation mechanism at the second interface boundary;

the barrier portion disposed between the ejection capsule and the anti-recoil capsule;

configured such that the ejection activation mechanism can engage the ejection capsule to initiate ignition of the ejection propulsion material in response to receiving the ejection signal, and the anti-recoil activation mechanism can engage the anti-recoil capsule to initiate ignition of the anti-recoil propulsion material in response to receiving the anti-recoil signal.

4. The ejection assembly, as claimed in claim 1, wherein: the ejection channel and the anti-recoil channel are provided as respective portions of a channel structure;

wherein the channel structure includes a barrier chamber for accommodating the barrier structure between the ejection channel and the anti-recoil channel; and the channel structure and the barrier structure includes cooperating interconnection mechanisms, operable to fasten the barrier structure to the channel structure.

5. The ejection assembly, as claimed in claim 1, comprising:

an activation control system for initiating and transmitting the ejection signal to the ejection activation mechanism, and the anti-recoil signal to the anti-recoil activation mechanism, the activation control system including an electrical connection between the ejection activation mechanism and the anti-recoil activation mechanism, operable to determine the relative timing of the ejection signal and the anti-recoil signal.

6. The ejection assembly, as claimed in claim 5, wherein: the activation control system configured for allowing the timing of the ejection and anti-recoil signals, and consequently the activation of the ejection activation mechanism and the anti-recoil activation mechanism, respectively, to be one or more of controlled independently of each other, allowing the ejection activation mechanism and the anti-recoil activation mechanism to be activated simultaneously; or for determining a time delay between their respective activation.

7. The ejection assembly, as claimed claim 1, wherein: at least one of the ejection activation mechanism and the anti-recoil activation mechanism comprise a strike element for one of electrically, mechanically, and electromechanically engaging the respective ejection capsule or anti-recoil capsule.

8. The ejection assembly, as claimed in claim 7, wherein: at least one of the ejection activation mechanism and the anti-recoil activation mechanism comprise a resilient member; and the resilient member disposed between the strike element and the barrier portion, for absorbing recoil energy imparted to the strike element.

9. The ejection assembly, as claimed in claim 1, further comprising:

an ejection capsule containing ejection propulsion material, and an anti-recoil capsule containing anti-recoil propulsion material.

10. The ejection assembly, as claimed in claim 1, further comprising:

an anti-recoil capsule, containing combustible anti-recoil propulsion material and one of a compensation body and a compensation liquid mass, for increasing the anti-recoil reaction force.

11. The ejection assembly, as claimed in claim 1, further comprising:

an ejection capsule containing combustible ejection propulsion material and the ejection body;

the ejection channel including an ejection chamber for accommodating the ejection capsule adjacent the first interface boundary of the barrier structure.

12. The ejection assembly, as claimed in claim 1, wherein: the anti-recoil channel comprises a nozzle for increasing the speed of the anti-recoil gas pressure pulse before it exits the anti-recoil channel;

the anti-recoil channel including a capsule chamber for housing an anti-recoil capsule, a convergent region for increasing the pressure of the anti-recoil gas, a divergent region for allowing the anti-recoil gas to expand, and a throat between the convergent region and the divergent region, the convergent region and the divergent region being in fluid communication with each other through the throat.

13. The ejection assembly, as claimed in claim 1, further comprising:

a plurality of ejection channels, the ejection channels being oriented in different directions to each other and operable to eject a plurality of respective ejection bodies in different directions.

14. The ejection assembly, as claimed in claim 1, further comprising:

a plurality of anti-recoil channels, the anti-recoil channels being oriented in different directions to each other, arranged such that the combined effect of respective anti-recoil capsules in each of the anti-recoil channels being simultaneously engaged by respective anti-recoil activation mechanisms is to oppose the ejection reaction force along or about a plurality of axes of the ejection assembly.

15. The ejection assembly, as claimed in claim 1, wherein: the ejection body further comprises:

a cannister contains at least one of a dye for staining intruders for future identification, an impact tool; and a cannister capable of emitting one of smoke, gas and atomized liquid droplets.

16. The ejection assembly, as claimed in claim 1, wherein: a difference between the ejection reaction force and the opposing anti-recoil reaction force, integrated over a time period, does not exceed 450 N, and is no less than 10% of the weight of the ejection assembly.

17. The ejection assembly, as claimed in claim 1, wherein: the ejection assembly is configured such that the barrier portion can sustain a transient pressure difference of 100 MPa to 500 MPa between ejection gas in the ejection channel and anti-recoil gas in the anti-recoil channel, for a period of 0.01 ms to 2 ms.

18. The ejection assembly as claimed in claim 1, wherein: the ejection assembly is configured to conduct at least one of:
   ejecting the ejection body having a diameter of 2 mm to 50 mm, and a mass of 1 g to 100 g; and
   ejecting the ejection body from the open end of the ejection channel at a speed of 50 m/s to 1,500 m/s.

19. A barrier structure, for an ejection assembly as claimed in claim 1, having a first interface boundary and a second interface boundary, and further comprising:
   a barrier portion between the first and second interface boundaries; and further comprising:
      an ejection activation mechanism housed within the barrier structure adjacent the first interface boundary;
      an anti-recoil activation mechanism housed within the barrier structure adjacent the second interface boundary;
      an ejection capsule containing the ejection propellant material, adjacent the ejection activation mechanism at the first interface boundary; and
      an anti-recoil capsule containing the anti-recoil propellant material, adjacent the anti-recoil activation mechanism at the second interface boundary; and
   configured such that the ejection activation mechanism can engage the ejection capsule in response to receiving an ejection signal, to initiate ignition of the ejection propulsion material; and the anti-recoil activation mechanism can engage the anti-recoil capsule in response to receiving an anti-recoil signal, to initiate ignition of the anti-recoil propulsion material.

20. A vehicle assembly, comprising:
a vehicle and an ejection assembly as claimed in claim 1, wherein:
   the vehicle and the ejection assembly are cooperatively configured for mounting the ejection assembly onto the vehicle, and the vehicle comprises an unmanned aerial vehicle (UAV).

\* \* \* \* \*